(12) United States Patent
Kim et al.

(10) Patent No.: US 10,645,718 B2
(45) Date of Patent: May 5, 2020

(54) METHOD AND APPARATUS FOR SCHEDULING FOR WIRELESS PACKET NETWORK

(71) Applicant: Samsung Electronics Co., Ltd., Suwon-si, Gyeonggi-do (KR)

(72) Inventors: Yohan Kim, Yongin-si (KR); Song Chong, Daejeon (KR); Eunyong Kim, Yongin-si (KR); Joseph Jeon, Seongnam-si (KR); Okyoung Choi, Daejeon (KR); Changsik Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 15/163,319

(22) Filed: May 24, 2016

(65) Prior Publication Data
US 2016/0353469 A1    Dec. 1, 2016

(30) Foreign Application Priority Data

May 29, 2015    (KR) .......................... 10-2015-0076241

(51) Int. Cl.
*H04W 72/12*    (2009.01)
(52) U.S. Cl.
CPC ............................... *H04W 72/1242* (2013.01)
(58) Field of Classification Search
CPC ......................... H04W 72/04; H04W 72/1242
USPC .......................................................... 370/329
See application file for complete search history.

(56) References Cited

U.S. PATENT DOCUMENTS

| | | | |
|---|---|---|---|
| 7,596,089 B2 | 9/2009 | Bi et al. | |
| 2004/0002341 A1* | 1/2004 | Chen ....................... | H04L 47/10 455/453 |
| 2006/0182128 A1* | 8/2006 | Nakata .................. | H04L 41/048 370/401 |
| 2006/0291377 A1* | 12/2006 | Imaizumi .............. | H04L 1/0002 370/218 |
| 2010/0034149 A1* | 2/2010 | Lederer ............... | H04W 72/042 370/329 |
| 2011/0182248 A1* | 7/2011 | Fan ......................... | H04L 47/14 370/329 |
| 2011/0213827 A1* | 9/2011 | Kaspar .................. | H04W 76/15 709/203 |
| 2014/0306833 A1* | 10/2014 | Ricci ....................... | B60Q 1/00 340/901 |

* cited by examiner

*Primary Examiner* — Samina F Choudhry
(74) *Attorney, Agent, or Firm* — Jefferson IP Law, LLP (57) ABSTRACT

A method for scheduling by a base station is provided. The method includes updating a first time that is required to complete ongoing data transmission with respect to terminals to which the base station is transmitting the data for a predetermined period, updating a second time that is delayed from a scheduled data transmission completion time with respect to the terminals whenever the data transmission is completed, determining priority values on the basis of the updated first time and the updated second time with respect to the terminals for the predetermined period, and performing the scheduling of the resources with respect to one or more of the terminals on the basis of the determined priority values for the predetermined period.

20 Claims, 8 Drawing Sheets

METHOD AND APPARATUS FOR SCHEDULING FOR WIRELESS PACKET NETWORK

CROSS-REFERENCE TO RELATED APPLICATION(S)

This application claims the benefit under 35 U.S.C. § 119(a) of a Korean patent application filed on May 29, 2015 in the Korean Intellectual Property Office and assigned Serial number 10-2015-0076241, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) KOREA ADVANCED INSTITUTE OF SCIENCE AND TECHNOLOGY.

TECHNICAL FIELD

The present disclosure relates to a method and an apparatus for scheduling for a wireless packet network. More particularly, the present disclosure relates to a method and an apparatus for scheduling for a wireless packet network, which can effectively determine a user who will transmit or receive a packet in a packet based wireless network.

BACKGROUND

A representative scheduler in the related art may be a proportional fair (PF) scheduler. The PF scheduler calculates a selection reference value on the basis of an instantaneous channel with respect to each user for each transmission unit time, and selects a user on the basis of the calculated selection reference value. The PF scheduler has the property of alternately selecting all users in an environment in which a user's instantaneous channel rate is not greatly changed.

As a performance index of a wireless network, there is a perceived throughput. The perceived throughput is a value that is obtained by dividing a file or a packet having a finite size B by time W taken to completely transmit the file or the packet. When using an application, a user can easily perceive the throughput performance. The perceived throughput is defined in the long term evolution (LTE) standard document TS 36.814, and may be expressed as in Equation 1.

$$R^p = \frac{B}{W} \qquad \text{Equation 1}$$

Here, the file or the packet having the finite size may be the file or the packet having a very small data unit or the file or the packet having a very large data unit within the limit that can be transmitted by a communication system. For convenience, in the present disclosure, the term "file" or "packet" is used, but is not limited thereto. All data sets that can be discriminated from other data sets may correspond to the term. For example, the term may include all typical packet units that are transmitted in LTE, wideband code division multiple access (WCDMA), worldwide interoperability for microwave access (WiMAX), WiFi, and the like.

The above information is presented as background information only to assist with an understanding of the present disclosure. No determination has been made, and no assertion is made, as to whether any of the above might be applicable as prior art with regard to the present disclosure.

SUMMARY

Although the proportional fair (PF) scheduler allocates resources through updating variables that are used to calculate the selection reference value for each transmission unit time, the PF scheduler does not consider the time taken to completely transmit the file or the packet, and thus it may not be an optimum scheduler from a viewpoint of the perceived throughput that can be easily perceived by the user. Accordingly, there is a need for implementation of a scheduler that shows a superior performance from a viewpoint of the perceived throughput (in particular, long-term perceived throughput).

Aspects of the present disclosure are to address at least the above-mentioned problems and/or disadvantages and to provide at least the advantages described below. Accordingly, an aspect of the present disclosure is to provide an apparatus and method for scheduling for a wireless packet network.

In accordance with an aspect of the present disclosure, a method for scheduling resources with respect to data that a base station transmits is provided. The method includes updating a first time that is required to complete ongoing data transmission with respect to terminals to which the base station is transmitting the data for a predetermined period, updating a second time that is delayed from a scheduled data transmission completion time with respect to the terminals whenever the data transmission is completed, determining priority values on the basis of the updated first time and the updated second time with respect to the terminals for the predetermined period, and performing the scheduling of the resources with respect to one or more of the terminals on the basis of the determined priority values for the predetermined period.

In accordance with another aspect of the present disclosure, a method for scheduling resources with respect to data that a base station receives is provided. The method includes updating a first time that is required to complete ongoing data transmission with respect to terminals that are transmitting the data to the base station for a predetermined period, updating a second time that is delayed from a scheduled data transmission completion time with respect to the terminals whenever the data transmission is completed, determining priority values on the basis of the updated first time and the updated second time with respect to the terminals for the predetermined period, and performing the scheduling of the resources with respect to one or more of the terminals on the basis of the determined priority values for the predetermined period.

In accordance with still another aspect of the present disclosure, a base station that transmits or receives data with terminals is provided. The base station includes a transceiver configured to transmit or receive the data with one or more of the terminals, a controller configured to update a first time that is required to complete ongoing data transmission with respect to the terminals to which the base station is transmitting the data for a predetermined period, to update a second time that is delayed from a scheduled data transmission completion time with respect to the terminals whenever the data transmission is completed, to determine priority values on the basis of the updated first time and the updated second time with respect to the terminals for the predetermined period, and to perform the scheduling of the resources with respect to one or more of the terminals on the basis of the determined priority values for the predetermined period, and a storage configured to store at least one of the updated first time, the updated second time, and the determined priority values.

In accordance with another aspect of the present disclosure, a base station that transmits or receives data with terminals is provided. The base station includes a transceiver configured to transmit or receive the data with one or more of the terminals, a controller configured to update a first time that is required to complete ongoing data transmission with respect to the terminals that are transmitting the data to the base station for a predetermined period, to update a second time that is delayed from a scheduled data transmission completion time with respect to the terminals whenever the data transmission is completed, to determine priority values on the basis of the updated first time and the updated second time with respect to the terminals for the predetermined period, and to perform the scheduling of the resources with respect to one or more of the terminals on the basis of the determined priority values for the predetermined period, and a storage configured to store at least one of the updated first time, the updated second time, and the determined priority values.

In accordance with an aspect of the present disclosure, although the scheduler guides transmission in the unit of a file or a packet to cause fairness between users to be broken as seen in a short term, the scheduler allocates by turns file or packet transmission priorities to secure fairness as seen in a long term.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method for performing scheduling with respect to an uplink or a downlink in order to improve the performance of a packet based wireless network in a base station, and can be expanded to other types of communication systems.

Hereinafter, for convenience in explanation of the present disclosure, wordings and names that are defined in the $3^{rd}$ generation partnership project long term evolution (3GPP LTE) are used. However, the present disclosure is not limited to such wordings and names, but may be applied to other systems excluding LTE in the same manner. In the present disclosure, a base station includes an evolved Node B (eNodeB), NodeB, radio network subsystem (RNS), base transceiver station (BTS), and wireless access point, and may also include a terminal that performs resource scheduling for data transmission and reception with another terminal.

In the description and claims of the present disclosure, the term "includes" does not mean to exclude other elements or operations. In the description and claims, a singular expression may include a plural expression unless specially described. For example, the term "terminal" may indicate one terminal or may include two or more terminals. In the description and claims, the term "unit" is given or mixedly used in consideration of ease in preparing the description, and does not have any distinguishable meaning or role by itself. In the description and claims, the terms "first," "second," "third," and so forth are used to distinguish similar elements, but are not necessarily used to describe them successively or in order.

In the description and claims, the term "user" or "terminal" may be mixedly used with user equipment (UE) that is defined in the LTE standard. The terminal includes all types of devices that communicate with a base station. For example, the terminal may include a portable multimedia player (PMP), a personal digital assistant (PDA), a smart phone, a smart device, a smart car, a cellular phone, a headphone, an earphone, a digital photo frame, and a wearable device. Further, the terminal may be a device that is fixedly installed in a specific location.

Hereinafter, various embodiments of the present disclosure will be described with reference to the accompanying drawings. The matters defined in the description, such as the detailed construction and elements, are nothing but specific details provided to assist those of ordinary skill in the art in a comprehensive understanding of the present disclosure, and explanation of other parts is simplified or omitted to prevent the gist of the present disclosure from being dispersed. Here, the features of the present disclosure are not limited to the embodiments disclosed hereinafter, but may include various modifications or even additional functions. In the accompanying drawings, some constituent elements are exaggerated, omitted, or roughly illustrated. Further, sizes of some constituent elements may not completely reflect the actual sizes thereof.

Figure 1:
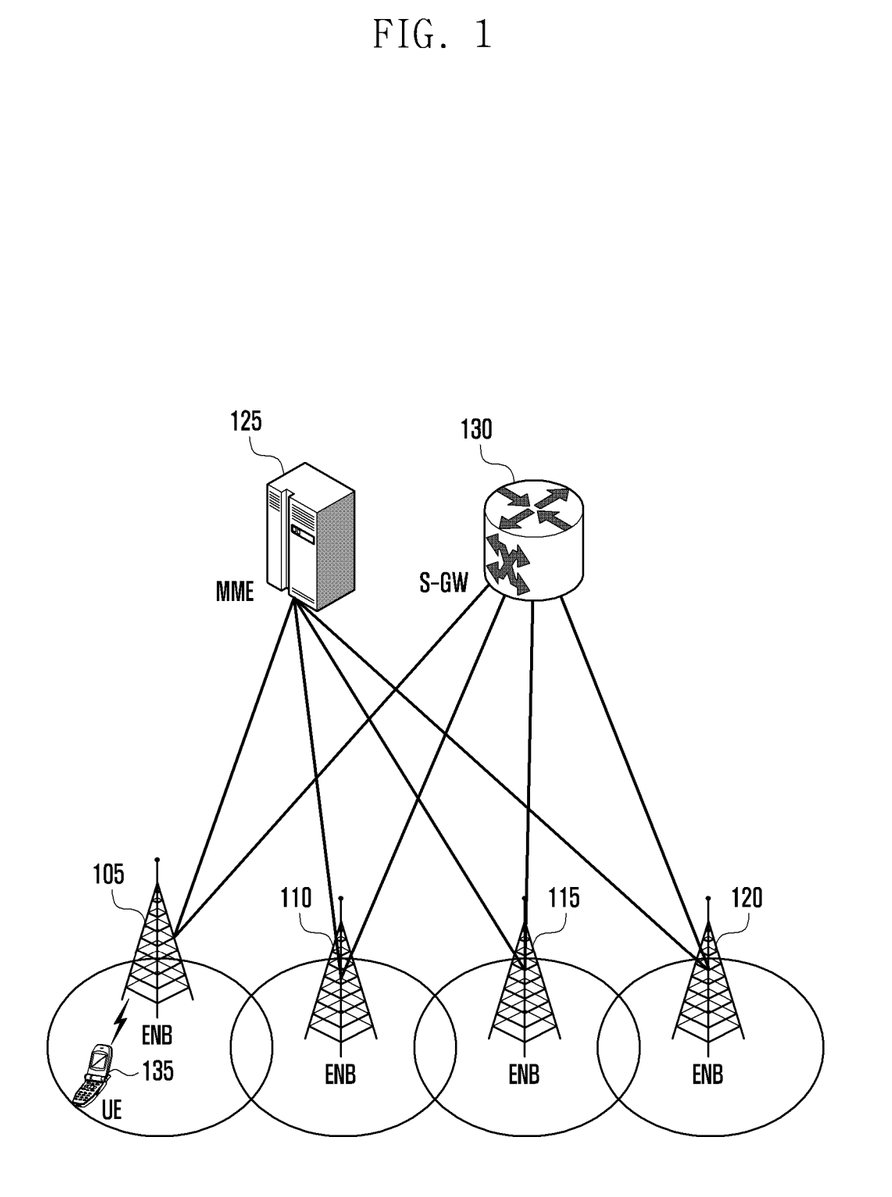
FIG. 1 is a diagram illustrating a structure of a long term evolution (LTE) system according to an embodiment of the present disclosure.

FIG. 1 is a diagram illustrating a structure of an LTE system according to an embodiment of the present disclosure.

Referring to FIG. 1, a radio access network of an LTE system includes evolved node Bs (hereinafter referred to as "ENBs") 105, 110, 115, and 120, a mobility management entity (MME) 125, and a serving-gateway (S-GW) 130. User equipment (hereinafter referred to as "UE") 135 is connected to an external network through the ENBs 105 to 120 and the S-GW 130.

In FIG. 1, the ENBs 105 to 120 correspond to the existing Node Bs of a universal mobile telecommunications system (UMTS) system. The ENBs are connected to the UE 135 through a radio channel and perform a more complicated role than the role of the Node Bs. Since all user traffic including a real-time service, such as a Voice Over Internet Protocol (VoIP) through the Internet protocol are serviced through a shared channel, a device that performs scheduling through gathering of status information, such as a buffer status of UE, an available transmission power status, or a channel status, is necessary, and the ENBs 105 to 120 take charge of this. One ENB typically controls a plurality of cells. In order to implement a transmission speed of 100 Mbps, the LTE system uses, for example, orthogonal frequency division multiplexing (OFDM) in the bandwidth of 20 MHz as a radio connection technology. Further, the LTE system uses adaptive modulation and coding (AMC) that determines a modulation scheme and a channel coding rate to match the channel status of the UE. The S-GW 130 is a device that provides a data bearer, and generates or removes the data bearer in accordance with the control of the MME 125. The MME is a device that takes charge of not only mobility management of the UE but also various kinds of control functions, and is connected to a plurality of ENBs.

Figure 2:
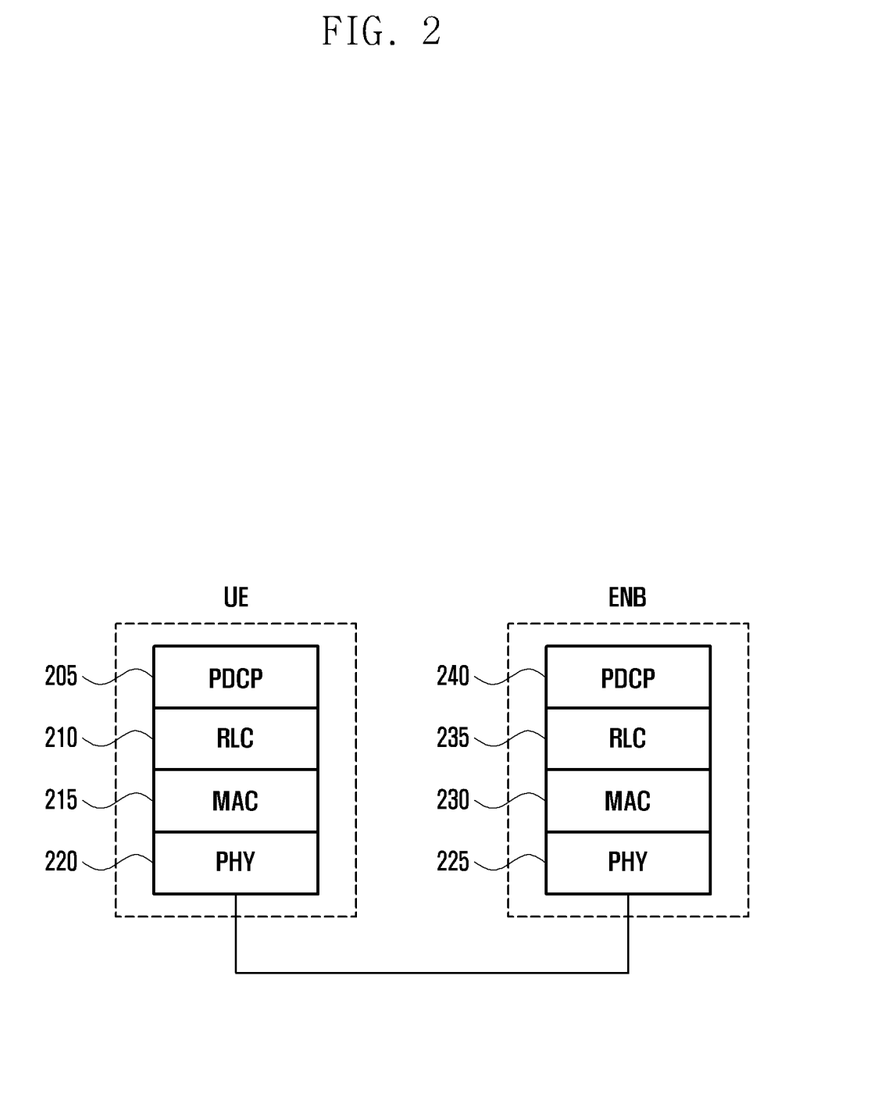
FIG. 2 is a diagram illustrating a wireless protocol structure in an LTE system according to an embodiment of the present disclosure.

FIG. 2 is a diagram illustrating a wireless protocol structure in an LTE system according to an embodiment of the present disclosure.

Referring to FIG. 2, a radio protocol of an LTE system is composed of a packet data convergence protocol (PDCP) 205 or 240, a radio link control (RLC) 210 or 235, and a medium access control (MAC) 215 or 230 in each of UE and ENB. The PDCP 205 or 240 takes charge of IP header compression/decompression operation, and the RLC 210 or 235 reconfigures a PDCP packet data unit (PDU) with an appropriate size. The MAC 215 or 230 is connected to various RLC layer devices configured in one UE, and performs multiplexing of RLC PDUs to a MAC PDU and demultiplexing of RLC PDUs from the MAC PDU. A physical layer 220 or 225 performs channel coding and modulation of upper layer data and produces an OFDM symbol to transmit the OFDM symbol to a radio channel, or performs demodulation and channel decoding of an OFDM symbol that is received through the radio channel to transfer the demodulated and decoded OFDM symbol to an upper layer. Further, even in the physical layer, for additional error correction, a hybrid automatic repeat request (HARQ) is used, and the receiving end transmits whether it received the packet transmitted from the transmitting end with one bit. This is called HARQ ACK/NACK information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PUCCH) or a physical uplink shared channel (PUSCH).

A scheduler according to the present disclosure and the proportional fair (PF) scheduler are mainly included in the MAC 230, and this will be described with reference to FIG. 4.

Figure 3:
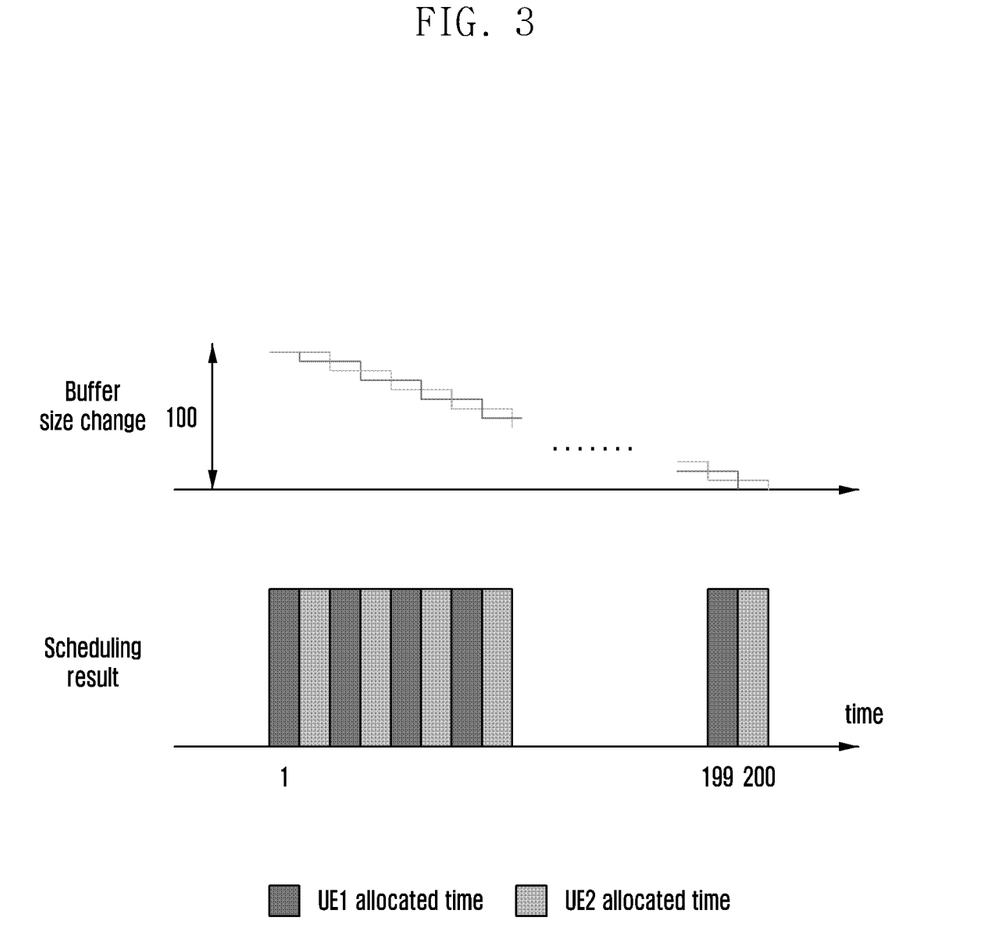
FIG. 3 is a diagram explaining a relationship between a proportional fair (PF) scheduler and perceived throughput according to an embodiment of the present disclosure.

FIG. 3 is a diagram explaining a relationship between a PF scheduler and perceived throughput according to an embodiment of the present disclosure.

Referring to FIG. 3, a packet is transmitted through alternate allocation of resources to UE1 and UE2 by scheduling of the PF scheduler in an environment in which a channel is not changed. In FIG. 3, both UE1 and UE2 transfer a packet having a size of 100 to a buffer to transmit the packet. The time when the size of the packet that remains in the buffer becomes 0 is 199 in the case of UE1 and is 200 in the case of UE2. Accordingly, both UE1 and UE2 transmit the packet having the size of 100 for the time of about 200, and from the viewpoint of perceived throughput, both UE1 and UE2 show the performance that is close to 100/200.

Figure 4:
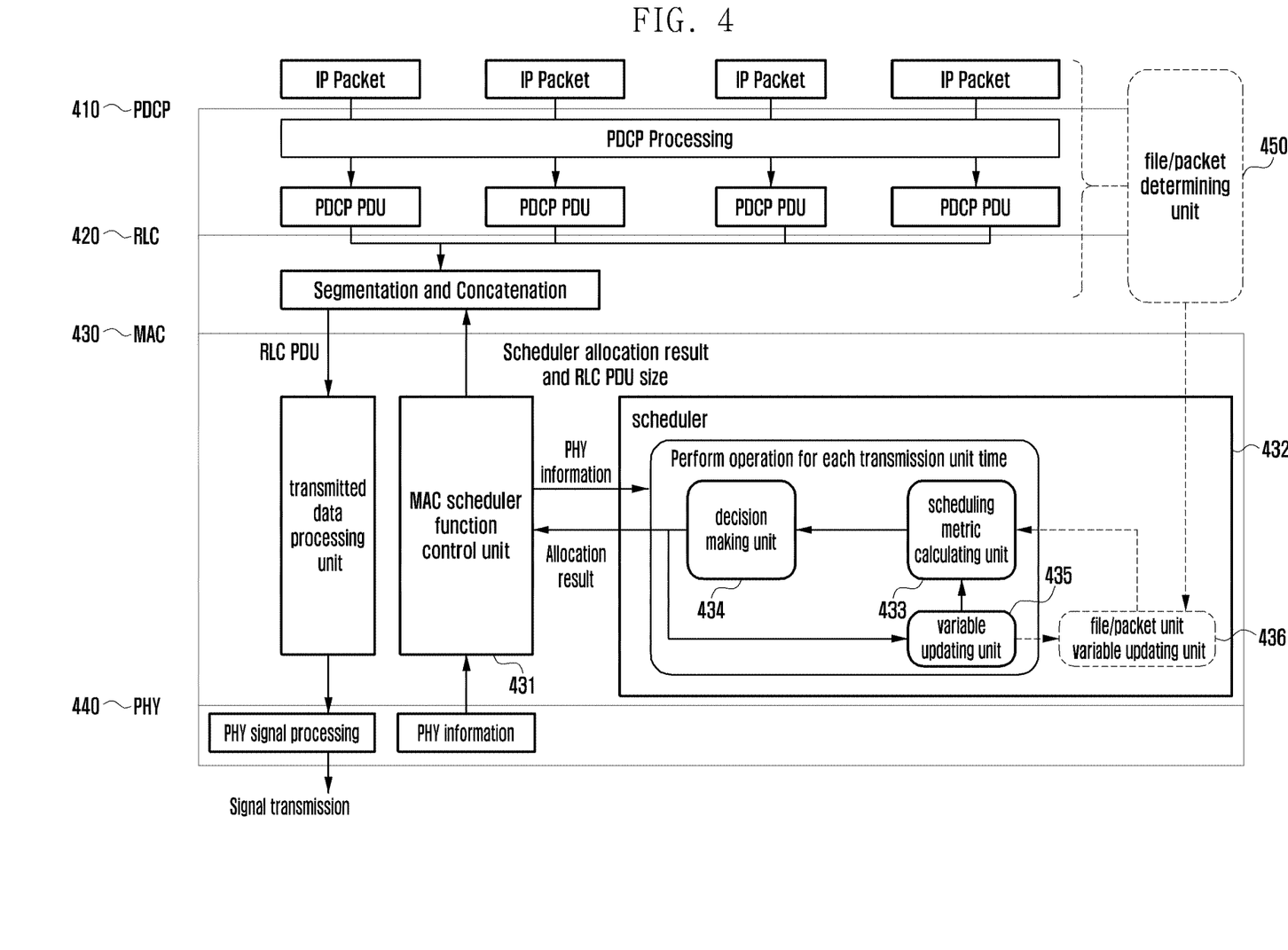
FIG. 4 is a diagram explaining operations by LTE layers in a case where scheduling is applied thereto according to an embodiment of the present disclosure.

FIG. 4 is a diagram explaining operations by LTE layers in a case where scheduling is applied thereto according to an embodiment of the present disclosure.

Referring to FIG. 4, a base station transmits downlink data to a user (terminal). If an IP packet arrives through the Internet, the IP packet is PDCP-processed (robust header compression (ROHC), ciphering, and the like) in a PDCP layer 410 to generate PDCP PDU to be transferred to an RLC layer 420. A PHY layer 440 transfers PHY information that is required for scheduling to a MAC layer 430. In this case, the detailed construction of the PHY information that is required for scheduling may differ depending on its implementation. A scheduler function controller 431 of the MAC layer 430 processes the PHY information and then transmits the processed PHY information to a scheduler 432.

Referring to FIG. 4, the scheduler 432 includes a scheduling metric calculating unit 433, a decision making unit 434, a variable updating unit 435, and a file/packet unit variable updating unit 436. The scheduler 432 performs scheduling for each transmission unit time (in LTE, transmission time interval (TTI) or subframe). The scheduling metric calculating unit 433 calculates a scheduling metric for each user. The decision making unit 434 selects a user being scheduled on the basis of the scheduling metric for each user. The variable updating unit 435 updates variables that are required to calculate the scheduling metric.

A file/packet determination unit 450 determines the size of the file or packet unit in which the file/packet unit variable of the scheduler is to be scheduled using one or more of three layers of RLC/PDCP/IP. FIG. 4 illustrates that the file/packet determining unit 450 is a separate block from the scheduler 432, but unlike this, the file/packet determining unit 450 may be included in the scheduler 432. The reference for determining the size of the file or packet may be determined by policy that to what unit extent fairness between users is to be guaranteed. In this case, methods for determining the packet size may differ from each other in accordance with layers, and various methods, such as deep packet inspection, may be performed in combination in order to grasp the use purpose of the file.

Since the scheduling metric calculating unit 433, the decision making unit 434, and the variable updating unit 435 perform operations for each transmission unit time, they are unable to consider the performance in the unit of a file/packet. The file/packet unit variable updating unit 436 updates the variables whenever the transmission of the file/packet with a size that is determined by one file/packet determining unit 450 is completed, other than for each transmission unit time, and sends the updated variables to the scheduling metric calculating unit 433, so that the scheduling metric calculating unit 433 can use the updated variables.

After performing the scheduling, the scheduler 432 transfers the selected user information and the data to be transmitted to the corresponding user with a size in the form of an RLC PDU size to the RLC layer 420. In order to generate the RLC PUD that is reported from the MAC layer 430, the RLC layer 410 performs segmentation/concatenation with respect to the PDCP PDUs that are generated by the PDCP layer 410 to construct them in the form of RLC PDU, and transfers the RLC PDU to the MAC layer 430. The MAC layer 430 processes the transferred RLC PDU and transfers the processed RLC PDU to the PHY layer 440, and the PHY layer 440 performs PHY signal processing.

The scheduler 432 can consider the performance in the file/packet unit, which is unable to be considered by the PF scheduler, and thus can prevent the perceived throughput to be lowered due to the change of the transmission order for each transmission unit time. Further, since the scheduling metric calculating unit uses the variables that are updated in the file/packet unit, the file/packet can be prevented from being continuously allocated to a specific user. Through the use of properly designed variables, the perceived throughput can be improved through the operation illustrated in FIG. 4, and fairness can be guaranteed at the same time.

The scheduling according to the present disclosure considers an objective function in Equation 2 to optimize the perceived throughput.

$$\min_{W} \max_{i} \frac{\overline{W}_i}{\overline{T}_i} \qquad \text{Equation 2}$$

where, $\overline{T}_i$ denotes a value that is obtained by dividing an average file size by an average channel rate, that is, an average time in which the file occupies the channel to be transmitted, and $\overline{W}_i$ denotes an average delay time. Accordingly, the objective function means scheduling so as to minimize the average delay time when a user who maximizes (average delay time/average channel occupation time) is searched for, which is to guarantee the fairness. If simply scheduling a user having long average delay time, only a user having long waiting time due to the channel that is not good is scheduled, and thus it is difficult to allocate the resources to the user having a good channel. However, if the scheduling is performed on the basis of the user having the average delay time that is longer than the average channel occupation time, the above-described problem can be addressed. Further, since the scheduling is performed so as to minimize the average delay time itself simultaneously with this intention, the scheduling is performed in a direction in which the perceived throughput is basically maximized. Accordingly, it can be known that the above objective function considers both the fairness and the perceived throughput performance.

Figure 5:
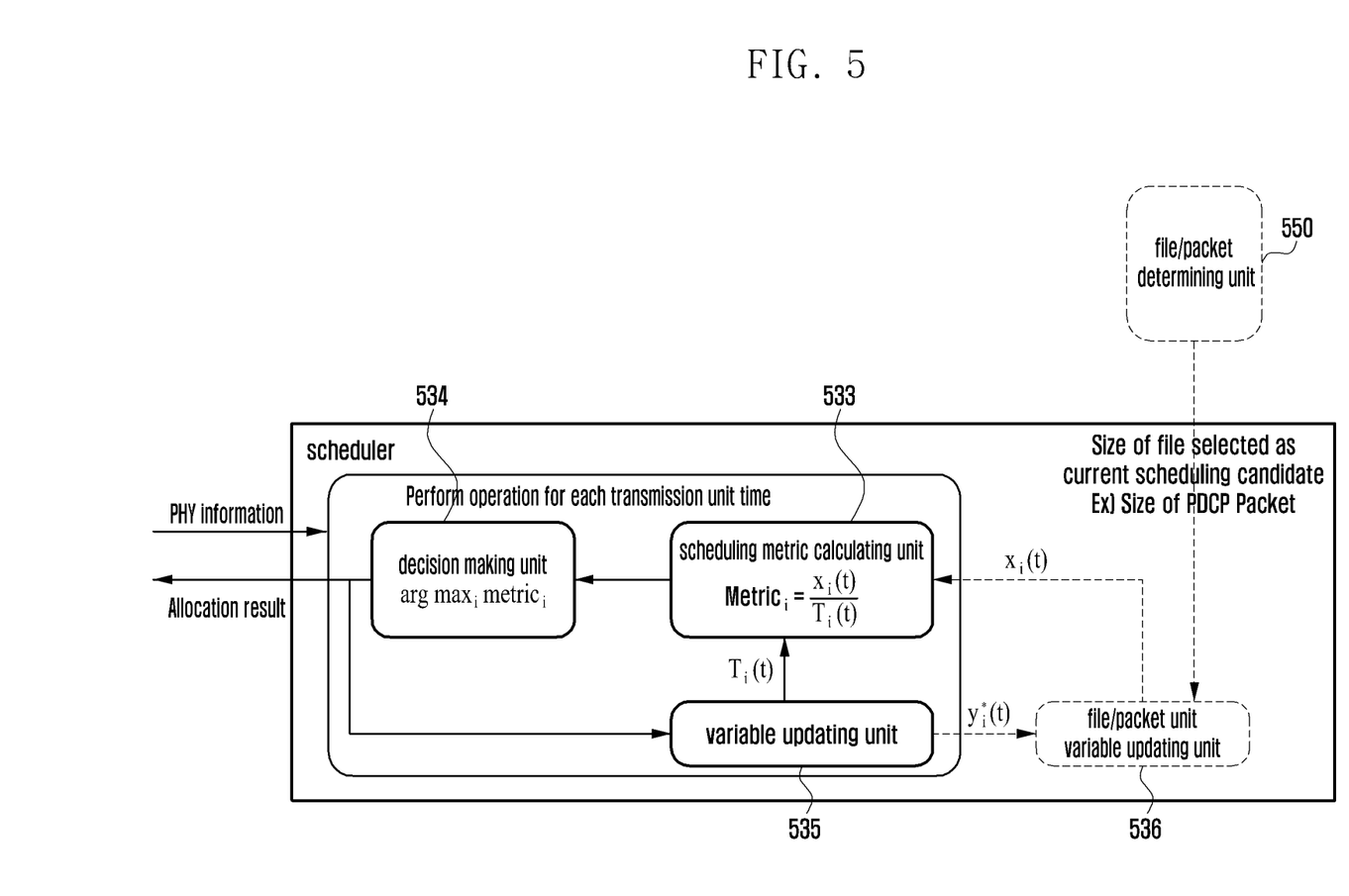
FIG. 5 is a diagram explaining operations of a scheduler according to an embodiment of the present disclosure.

FIG. 5 is a diagram explaining operations of a scheduler according to an embodiment of the present disclosure.

Referring to FIG. 5, a scheduler includes a scheduling metric calculating unit 533, a decision making unit 534, a variable updating unit 535, and a file/packet unit variable updating unit 536.

An output $T_i(t)$ of the variable updating unit 535 corresponds to a time that is required to complete the transmission on the assumption that the size $b_i(t)$ of the file that remains in a buffer is continuously transmitted at the current transmission channel rate $\mu_i(t)$. A user who is expected to have not too long file transmission time (user having small $b_i(t)$ or small $\mu_i(t)$) generally has small value of $T_i(t)$. Since $T_i(t)$ is changed for each transmission unit time, and in a situation in which the channel status is not changed, only a user who is scheduled at the current transmission unit time has a reduced value of $T_i(t)$, there is a high probability that the user who was selected at the previous transmission unit time is reselected unless $x_i(t)$ is greatly changed according to the time. Accordingly, there is a high tendency that the user who has started to transmit one file is continuously selected until the corresponding file is completely transmitted.

The term "$y_i(t)$" is a value that is added to users who are not selected in the case where a specific user is selected at each scheduling time. For example, if only one of three users is selected during the scheduling, the two remaining users commonly have $y_i(t)$ to which a basic unit time is added. That is, $y_i(t) \geq T_i(t)$ is basically established as a value that is updated by user's selection for each transmission unit time. Accordingly, it may be considered as a delay value of the file that is the current allocation target.

An output $y^*_i(t)$ of the variable updating unit 535 indicates a delay time value that is allocated to correspond to each user (packet). The base station may determine $y^*_i(t)$ using a separate calculating unit. In this case, in order to maximize the perceived throughput of each packet, the scheduler may determine the expected optimum delay as $y^*_i(t)$. Further, the base station may designate the same value or a different value with respect to each packet. That is, $y^*_i(t)$ is a value that is determined as a separate reference by the scheduler for a performance gain.

An output $x_i(t)$ of the file/packet unit variable updating unit 536 is operated to be updated after transmission of each file (packet) is completed. In this case, the reference point where the file transmission is completed may be designated by the file/packet determining unit 550. For example, the file/packet determination unit 550 may determine to update a file/packet unit variable with the size of a PDCP packet.

The output $x_i(t)$ may correspond to a value that is obtained by accumulating a time that is delayed from the scheduled data transmission completion time. That is, $x_i(t)$ may correspond to a value that is obtained by accumulating a value that is obtained by subtracting the scheduled delay time $y^*_i(t)$ from the actual delay time $y_i(t)$. Unlike this, $x_i(t)$ may correspond to a value that is obtained by accumulating a time that is delayed from the scheduled data transmission completion time. In this case, the value that is obtained by subtracting the scheduled delay time $y^*_i(t)$ from the actual delay time $y_i(t)$ is considered only with respect to a case where the data is transmitted. It can be known that a user having large $x_i(t)$ has a large number of data transmissions for which the actual delay time is longer the scheduled (allocated) delay time.

An output $metric_i$ of the scheduling metric calculating unit 533 corresponds to a value that is obtained by dividing $x_i(t)$ by $T_i(t)$, and the decision making unit 534 may perform scheduling using Equation 3.

$$i^* \text{argmax}_i \frac{x_i(t)}{T_i(t)} \quad \text{Equation 3}$$

where, $$T_i(t) = \frac{b_i(t)}{\mu_i(t)}, \quad x_i\left(t + \sum_i y_i(t)\right) = [x_i(t) + y_i(t) - y_i^*(t)]^+$$

Figure 6:
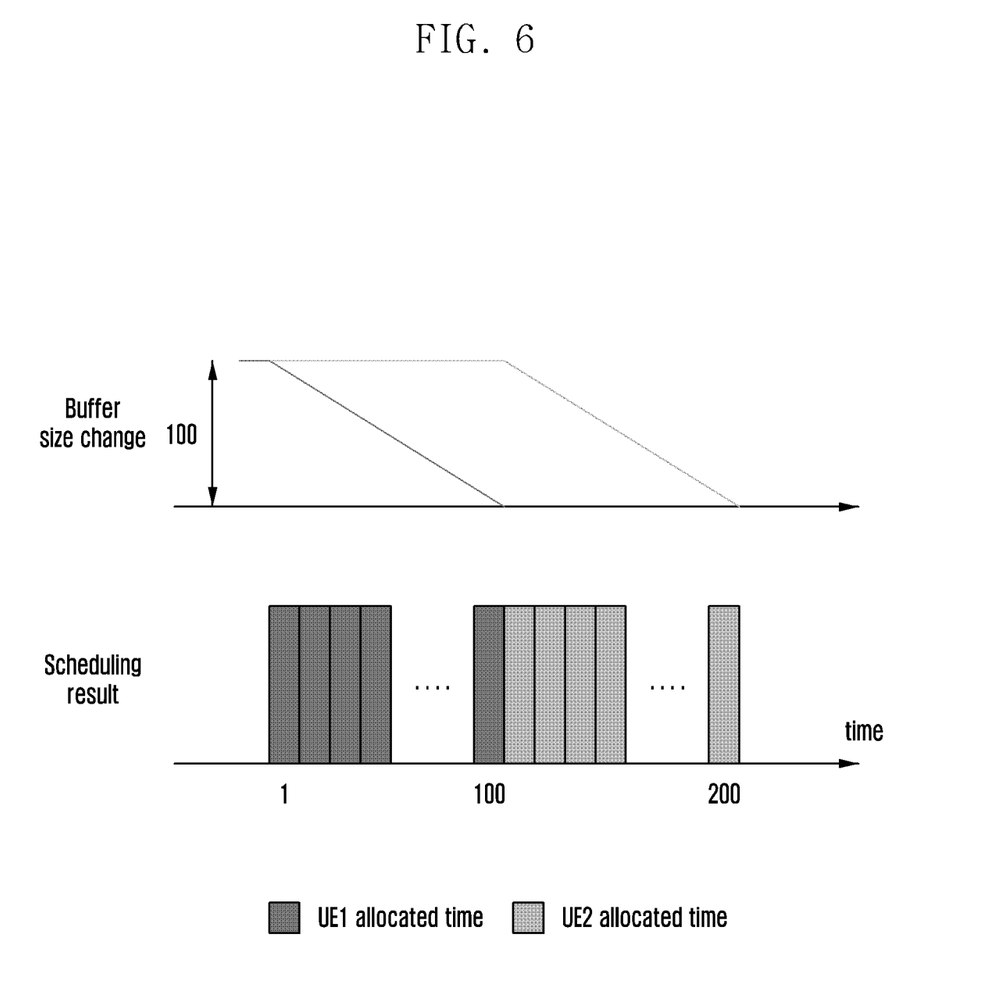
FIG. 6 is a diagram explaining a relationship between a scheduler and perceived throughput according to an embodiment of the present disclosure.

FIG. 6 is a diagram explaining a relationship between a scheduler and perceived throughput according to an embodiment of the present disclosure.

Referring to FIG. 6, a packet transmission of UE1 is completed by scheduling of the scheduler according to the present disclosure in an environment in which the channel is not changed, and resources are allocated to UE2 to transmit a packet. In FIG. 6, in the case of UE1, the time when the size of the packet that remains in the buffer having the size of 100 becomes 0 is 100. Accordingly, in the case of UE1, the perceived throughput corresponds to 100/100, superior performance can be achieved in comparison to the case of FIG. 3.

Figure 7:
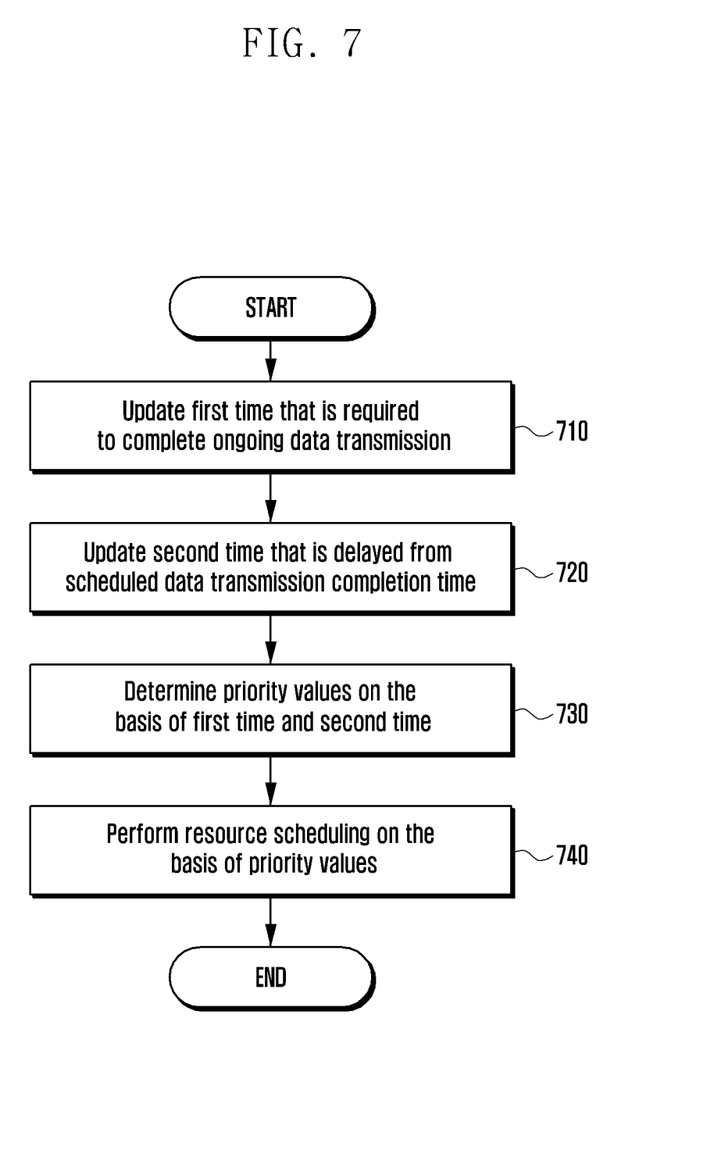
FIG. 7 is a diagram explaining a method for scheduling resources with respect to data that a base station transmits according to an embodiment of the present disclosure.

FIG. 7 is a diagram explaining a method for scheduling resources with respect to data that a base station transmits according to an embodiment of the present disclosure.

Referring to FIG. 7, an explanation will be made on the basis of downlink data that a base station transmits. However, respective operations shown in FIG. 7 may be applied even to uplink data that the base station receives in the same manner. The base station may perform the following operation in consideration of channel status information that is received from respective terminals.

At operation 710, the base station updates a first time that is required to complete ongoing data transmission with respect to the terminals to which the base station is transmitting the data for a predetermined period. In the case of transmitting uplink data, the base station updates the first time that is required to complete the ongoing data transmission with respect to the terminals that are transmitting the data to the base station for the predetermined period. The predetermined period may correspond to TTI or subframe, but may be implemented in a different manner. The data may be a file or a packet having a finite size, and the file or the packet may have a very small data unit or may have a very large data unit. The first time may correspond to $T_i(t)$ in FIG. 5.

In the case of the downlink data transmission, the first time may be updated on the basis of the size of the transmitted data that remains in a buffer of the base station and the current transmission speed with respect to the terminals. In the case of the uplink data transmission, the first time may be updated on the basis of the size of the transmitted data that remains in buffers of the terminals and the current transmission speed with respect to the terminals. The size of the transmitted data that remains in the buffers of the terminals may be determined on the basis of the buffer status report that the respective terminals transmit to the base station.

At operation 720, the base station may update a second time that is delayed from a scheduled data transmission completion time with respect to the terminals whenever the data transmission is completed. The second time may correspond to $x_i(t)$ in FIG. 5. The data transmission may correspond to any one of the uplink data and the downlink data.

At operation 730, the base station may determine priority values on the basis of the updated first time and the updated second time with respect to the terminals for the predetermined period. At operation 730, the priority values may be determined in consideration of the current updated first time and the current updated second time only. Further, the priority values may be determined in consideration of one or more first times before being updated and one or more second times before being updated. The priority values may correspond to $metric_i$ in FIG. 5.

At operation 740, the base station may perform the scheduling of the resources with respect to one or more of the terminals on the basis of the determined priority values for the predetermined period. In this case, Equation 3 may be applied thereto.

Figure 8:
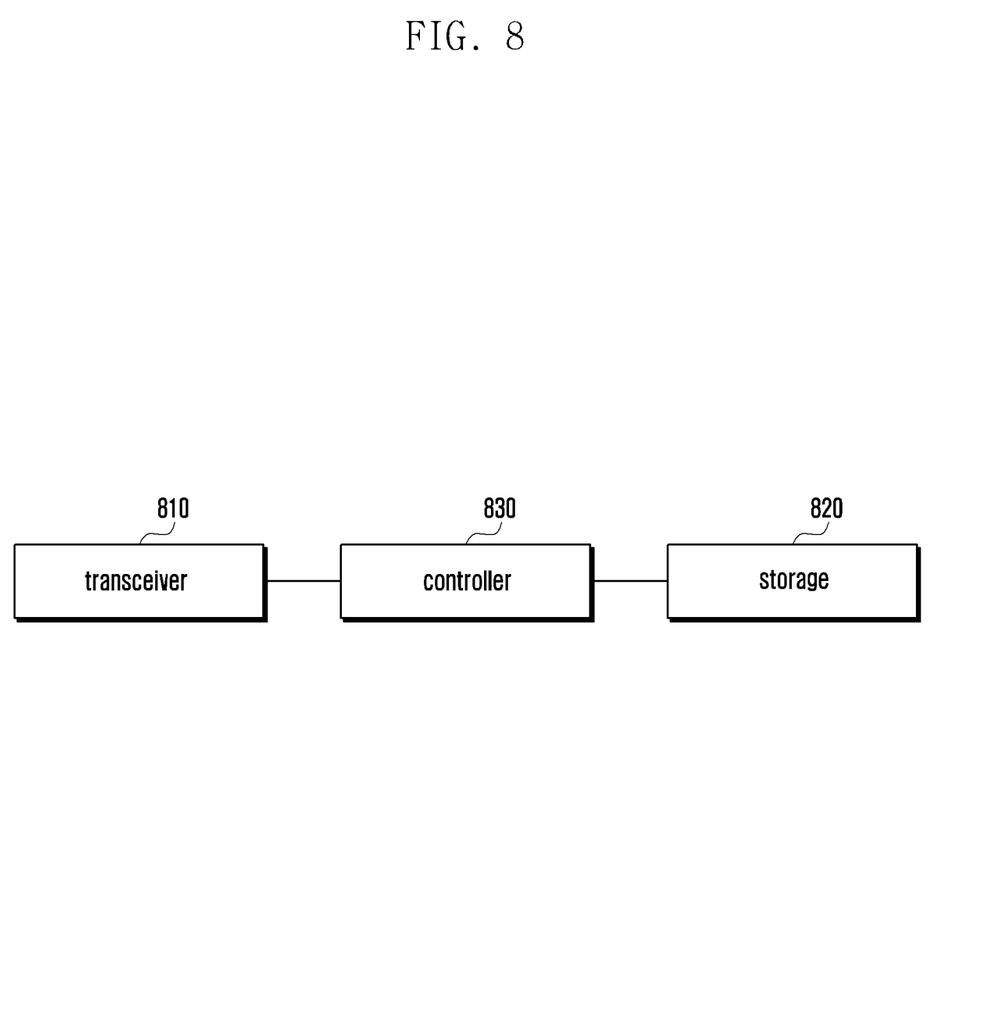
FIG. 8 is a diagram illustrating a configuration of an apparatus for scheduling resources according to an embodiment of the present disclosure.

FIG. 8 is a diagram illustrating a configuration of an apparatus for scheduling resources according to an embodiment of the present disclosure.

Referring to FIG. 8, the apparatus may include a transceiver 810, a storage 820, and a controller 830. The apparatus may include the base station.

The transceiver 810 may transmit or receive data or information related to resource scheduling through performing communication with another network device (base station or terminal).

The storage 820 may store information that is collected by the apparatus or information that is separately input. The storage 820 may store application programs corresponding to functions that can be performed in the apparatus and data that is generated during performing the functions in the terminal. The storage 820 may store, for example, variables, such as $T_i(t)$, $y_i(t)$, and $metric_i$. The storage 820 may store at least one of the updated first time, the updated second time, and the determined priority values.

The controller 830 controls the overall statuses and operations of the constitute units of the apparatus. The controller 830 may operate to store information that is transferred through the transceiver 810 in the storage 820. The controller 830 may control other units to perform various embodiments that are explained in the present disclosure. For example, the controller 830 may operate as a scheduler shown in FIG. 4 or 5.

FIG. 8 illustrates that the transceiver 810, the storage 820, and the controller 830 are configured as separate blocks to perform different functions. However, this is merely for convenience in description, but the functions may not be separately implemented. Further, the apparatus of FIG. 8 may include other blocks (e.g., input unit) excluding the above-described blocks. The methods according to the embodiments that are described in claims or description may be implemented by hardware, software, or a combination thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a base station, the method comprising:
   determining in which packet size a variable for scheduling of a plurality of terminals is updated;
   updating, for a transmission time interval (TTI), a first time that is required to complete an ongoing data transmission for each of the plurality of terminals to which the base station is transmitting data;
   updating, upon completing the ongoing data transmission of a data packet with the determined packet size, a second time that is delayed from a predicted data transmission completion time for each of the plurality of terminals;
   determining a priority value for the plurality of terminals based on the updated first time and the updated second time, wherein a perceived throughput is maximized based on the determining of the priority value;
   performing a scheduling of resources for the plurality of terminals based on the determined priority value; and
   communicating with each of the plurality of terminals according to a result of the scheduling.

2. The method of claim 1,
   wherein the packet size is determined based on a use purpose of a data packet, the use purpose being identified by a deep packet inspection, and
   wherein the determining of the priority value comprises determining the priority value in consideration of one or more previous first times and one or more previous second times.

3. The method of claim 2, wherein the determining of the priority value comprises determining the priority value on the basis of an average time of the updated first time and the one or more previous first times and an average time of the updated second time and the one or more previous second times.

4. The method of claim 2, wherein the determining of the priority value comprises determining the priority value on the basis of an accumulated time of the updated first time and the one or more previous first times and an accumulated time of the updated second time and the one or more previous second times.

5. The method of claim 1, wherein the updating of the first time comprises updating the first time on the basis of a size of data that remains in a buffer of the base station and a current transmission speed with respect to the terminals.

6. A method by a base station, the method comprising:
   determining in which packet size a variable for scheduling of a plurality of terminals is updated;
   updating, for a transmission time interval (TTI), a first time that is required to complete an ongoing data transmission for each of the plurality of terminals that are transmitting data to the base station;
   updating, upon completing the ongoing data transmission of a data packet with the determined packet size, a second time that is delayed from a predicted data transmission completion time for each of the plurality of terminals;
   determining a priority value for the plurality of terminals based on the updated first time and the updated second time, wherein a perceived throughput is maximized based on the determining of the priority value;
   performing a scheduling of resources for the plurality of terminals based on the determined priority value; and
   communicating with each of the plurality of terminals according to a result of the scheduling.

7. The method of claim 6,
   wherein the packet size is determined based on a use purpose of a data packet, the use purpose being identified by a deep packet inspection, and
   wherein the determining of the priority value comprises determining the priority value in consideration of one or more previous first times and one or more previous second times.

8. The method of claim 7, wherein the determining of the priority value comprises determining the priority value on the basis of an average time of the updated first time and the one or more previous first times and an average time of the updated second time and the one or more previous second times.

9. The method of claim 7, wherein the determining of the priority value comprises determining the priority value on the basis of an accumulated time of the updated first time and the one or more previous first times and an accumulated time of the updated second time and the one or more previous second times.

10. The method of claim 6, further comprising:
    receiving a buffer status report from the each of the plurality of terminals; and
    determining a size of the transmitted data that remains in a buffer of the plurality of terminals on the basis of the received buffer status information,
    wherein the updating the first time includes updating the first time on the basis of the size of data that remains in the buffer of the plurality of terminals and a current transmission speed.

11. A base station that transmits or receives data with terminals, the base station comprising:
    a transceiver configured to transmit or receive the data with one or more of the terminals;
    at least one processor coupled with the transceiver and configured to:
        determine in which packet size a variable for scheduling of a plurality of terminals is updated,
        update, for a transmission time interval (TTI), a first time that is required to complete an ongoing data transmission for each of the plurality of terminals to which the base station is transmitting data,
        update, upon completing the ongoing data transmission of a data packet with the determined packet size, a second time that is delayed from a predicted data transmission completion time for each of the plurality of terminals,
        determine a priority value for the plurality of terminals based on the updated first time and the updated second time wherein a perceived throughput is maximized based on the determining of the priority value,
        perform a scheduling of resources for the plurality of terminals based on the determined priority value, and
        control the transceiver to communicate with each of the plurality of terminals according to a result of the scheduling; and
    a storage configured to store at least one of the updated first time, the updated second time, and the determined priority value.

12. The base station of claim 11,
    wherein the packet size is determined based on a use purpose of a data packet, the use purpose being identified by a deep packet inspection, and
    wherein the at least one processor is further configured to determine the priority value in consideration of one or more previous first times and one or more previous second times.

13. The base station of claim 12, wherein the at least one processor is further configured to determine the priority value on the basis of an average time of the updated first time and the one or more previous first times and an average time of the updated second time and the one or more previous second times.

14. The base station of claim 12, wherein the at least one processor is further configured to determine the priority value on the basis of an accumulated time of the updated first time and the one or more previous first times and an accumulated time of the updated second time and the one or more previous second times.

15. The base station of claim 11, wherein the at least one processor is further configured to update the first time on the basis of a size of data that remains in a buffer of the base station and a current transmission speed with respect to the terminals.

16. A base station that transmits or receives data with terminals, the base station comprising:
   a transceiver configured to transmit or receive the data with one or more of the terminals;
   at least one processor coupled with the transceiver and configured to:
      determine in which packet size a variable for scheduling of a plurality of terminals is updated,
      update, for a transmission time interval (TTI), a first time that is required to complete an ongoing data transmission for each of the plurality of terminals that are transmitting data to the base station,
      update, upon completing the ongoing data transmission of a data packet with the determined packet size, a second time that is delayed from a predicted data transmission completion time for each of the plurality of terminals,
      determine a priority value for the plurality of terminals based on the updated first time and the updated second time, wherein a perceived throughput is maximized based on the determining of the priority value,
      perform a scheduling of resources for the plurality of terminals based on the determined priority value, and
      control the transceiver to communicate with each of the plurality of terminals according to a result of the scheduling; and
   a storage configured to store at least one of the updated first time, the updated second time, and the determined priority value.

17. The base station of claim 16,
   wherein the packet size is determined based on a use purpose of a data packet, the use purpose being identified by a deep packet inspection, and
   wherein the at least one processor is further configured to determine the priority value in consideration of one or more previous first times and one or more previous second times.

18. The base station of claim 17, wherein the at least one processor is further configured to determine the priority value on the basis of an average time of the updated first time and the one or more previous first times and an average time of the updated second time and the one or more previous second times.

19. The base station of claim 17, wherein the at least one processor is further configured to determine the priority value on the basis of an accumulated time of the updated first time and the one or more previous first times and an accumulated time of the updated second time and the one or more previous second times.

20. The base station of claim 16,
   wherein the transceiver is further configured to receive a buffer status report from the each of the plurality of terminals, and
   wherein the at least one processor is further configured to:
      determine a size of the transmitted data that remains in a buffer of the plurality of terminals on the basis of the received buffer status information, and
      update the first time on the basis of the size of data that remains in the buffer of the plurality of terminals and a current transmission speed.

* * * * *

UNITED STATES PATENT AND TRADEMARK OFFICE
CERTIFICATE OF CORRECTION

PATENT NO. : 10,645,718 B2
APPLICATION NO. : 15/163319
DATED : May 5, 2020
INVENTOR(S) : Kim et al.

Page 1 of 1

It is certified that error appears in the above-identified patent and that said Letters Patent is hereby corrected as shown below:

On the Title Page

Item (73), Line 3, insert --Korea Advanced Institute of Science and Technology, Daejeon (KR)--

Signed and Sealed this
Twenty-second Day of December, 2020

Andrei Iancu
*Director of the United States Patent and Trademark Office*